(12) United States Patent
Gondek et al.

(10) Patent No.: US 10,885,612 B2
(45) Date of Patent: Jan. 5, 2021

(54) LUMINANCE-BIASED SHARPENING FOR THERMAL MEDIA PRINTING

(71) Applicant: Hewlett-Packard Development Company, L.P., Houston, TX (US)

(72) Inventors: Jay S. Gondek, Vancouver, WA (US); Jason M. Quintana, Vancouver, WA (US); Milan Crowley Justel, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 125 days.

(21) Appl. No.: 16/176,984

(22) Filed: Oct. 31, 2018

(65) Prior Publication Data

US 2020/0134786 A1     Apr. 30, 2020

(51) Int. Cl.
  *G06T 5/00*     (2006.01)
  *H04N 1/409*    (2006.01)
  *H04N 1/40*     (2006.01)

(52) U.S. Cl.
  CPC .......... *G06T 5/003* (2013.01); *H04N 1/4092* (2013.01); *G06T 2207/20192* (2013.01); *H04N 1/40012* (2013.01)

(58) Field of Classification Search
  CPC .......... G06T 5/003; G06T 2207/20192; H04N 1/4092; H04N 1/40012
  See application file for complete search history.

(56) References Cited

U.S. PATENT DOCUMENTS

| 6,195,467 | B1 | 2/2001 | Asimopoulos et al. |
| 6,847,377 | B2 | 1/2005 | Kitahara |
| 7,391,901 | B2 | 6/2008 | de Queiroz et al. |
| 8,687,913 | B2 | 4/2014 | Lin |
| 2008/0089580 | A1* | 4/2008 | Marcu ............... H04N 9/045 382/162 |

FOREIGN PATENT DOCUMENTS

| CN | 106303158 | 1/2017 |
| EP | 2851866 | 3/2015 |
| JP | 3449860 B2 | 9/2003 |
| RU | 2643663 C2 | 2/2018 |
| WO | WO-2002025589 A1 | 3/2002 |

\* cited by examiner

*Primary Examiner* — Leon Flores
(74) *Attorney, Agent, or Firm* — Mannava & Kang

(57) ABSTRACT

In some examples, luminance-biased sharpening for thermal media printing may include converting an input image to a grayscale luminance representation. For each pixel of a plurality of specified pixels of the converted input image, a sharpening lightness value may be determined. Further, for each pixel of the plurality of specified pixels of the converted input image, a ratio of the sharpening lightness value to a corresponding original lightness value may be determined. Based on the determined ratio, a sharpened output image corresponding to the input image may be generated.

14 Claims, 5 Drawing Sheets

400

CONVERT AN INPUT IMAGE TO A GRAYSCALE LUMINANCE REPRESENTATION
402

DETERMINE, FOR EACH PIXEL OF A PLURALITY OF SPECIFIED PIXELS OF THE CONVERTED INPUT IMAGE, A SHARPENING LIGHTNESS VALUE
404

DETERMINE, FOR EACH PIXEL OF THE PLURALITY OF SPECIFIED PIXELS OF THE CONVERTED INPUT IMAGE, A RATIO OF THE SHARPENING LIGHTNESS VALUE TO A CORRESPONDING ORIGINAL LIGHTNESS VALUE
406

MULTIPLY, FOR EACH PIXEL OF THE PLURALITY OF SPECIFIED PIXELS OF THE CONVERTED IMAGE, AN OUTPUT PIXEL VALUE BY A CORRESPONDING VALUE OF THE DETERMINED RATIO
408

GENERATE, BASED ON THE MULTIPLYING, FOR EACH PIXEL OF THE PLURALITY OF SPECIFIED PIXELS OF THE CONVERTED IMAGE, OF THE OUTPUT PIXEL VALUE BY THE CORRESPONDING VALUE OF THE DETERMINED RATIO, A SHARPENED OUTPUT IMAGE CORRESPONDING TO THE INPUT IMAGE
410

FIG. 4

LUMINANCE-BIASED SHARPENING FOR THERMAL MEDIA PRINTING

CROSS-REFERENCE TO RELATED APPLICATION

This application includes similar subject matter as PCT Patent Application Serial No. TBD (Attorney Docket No. 84976876), filed Oct. 31, 2018, the disclosure of which is hereby incorporated by reference in its entirety.

BACKGROUND

A variety of techniques may be used for printing on media. One such technique includes the use of thermal printheads. Thermal printheads may utilize a set of resistor elements that are heated to apply heat directly to the media, or to a thermal transfer ribbon. The applied heat may produce a specified print pattern on the media. The specified print pattern may include, for example, text, images, and other such patterns.

BRIEF DESCRIPTION OF DRAWINGS

Features of the present disclosure are illustrated by way of example and not limited in the following figure(s), in which like numerals indicate like elements, in which:

FIG. 4 illustrates an example flowchart of a method for performing luminance-biased sharpening for thermal media printing.

DETAILED DESCRIPTION

Figure 1:
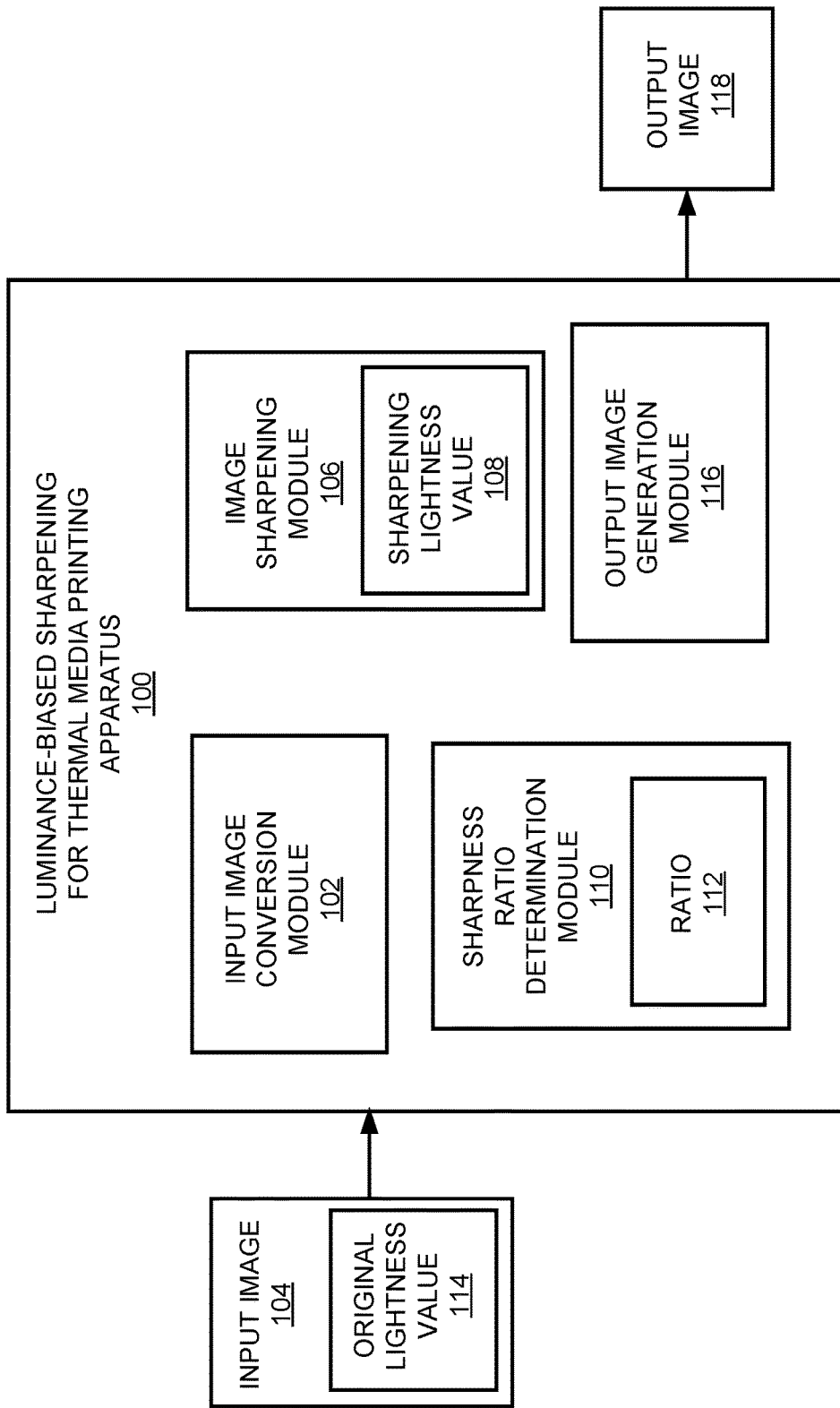
FIG. 1 illustrates an example layout of a luminance-biased sharpening for thermal media printing apparatus.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Apparatuses for luminance-biased sharpening for thermal media printing, methods for luminance-biased sharpening for thermal media printing, and non-transitory computer readable media having stored thereon machine readable instructions to provide luminance-biased sharpening for thermal media printing are disclosed herein. The apparatuses, methods, and non-transitory computer readable media disclosed herein provide for implementation of a bias to an image sharpening process to create higher contrast in cooling (e.g., light edge regions) than in heat (e.g., dark edge regions). In addition, the apparatuses, methods, and non-transitory computer readable media disclosed herein provide for implementation of a bias for sharpening towards pixel lightening to reduce energy consumption. In this regard, after image sharpening, the resulting pixels may either be lighter than the original, darker, or the same. An edge may be described as a transition from light to dark, and after sharpening, along the edge, pixels on the dark side may become darker, and pixels on the light side may become lighter. Since the printhead elements heat to create darker pixels, and cools with reduced or no energy input to make lighter pixels, when biasing toward lightness in the sharpening transform, less energy may be used.

With respect to thermal printheads, such printheads may be used to produce media (e.g., photo) prints. For example, such printheads may be used to produce media prints in the areas of dye-sub, thermally reactive media, and other such technologies. The media for thermal printheads may include a plurality of layers, for example, including yellow, magenta, and cyan coatings. When these coatings are heated beyond a certain melt point that may be different for each coating layer, the coatings become colorful. Images printed by such printheads may include a characteristic un-sharpness in the output due to (among other things) the retention of heat at the thermal printhead resistor elements. For example, if a thermal printhead prints a relatively dark area, followed by a relatively light area, the retained heat may blur the edge between dark and light. This is because the printhead elements may heat up relatively quickly, and cool down relatively slowly.

Image sharpening may be used to overcome sharpness limitations of thermal print technology. In this regard, image sharpening may be performed, for example, by increasing pixel contrast in a small region. However, the increase of the pixel contrast may affect image quality for thermal printers, for example, because the image sharpening process may create high heat dark pixels with high-frequency transitions to light pixels. The dark pixels may locally heat the printhead at a high-frequency, and the relatively slow cool-down may mean that adjacent pixels, which may be intended to be relatively light after sharpening, may be exposed to excess heat. This excessive exposure of dark pixels may affect adjacent pixels, for example, by causing cyan development (and other colorants) in relatively high contrast areas due to thermal bleed. For example, for an image of a person, this excessive heat exposure of dark pixels may cause cyan coloration in the hair, and a darkening of features such as eyes and teeth. In this regard, it is technically challenging to minimize or eliminate, for example, the excessive heat exposure of dark pixels.

In order to address the aforementioned technical challenges related to the excessive heat exposure of dark pixels, since printhead element cooling occurs at a lower rate and resulting frequency compared to heating, the sharpening process may be biased to create higher contrast in cooling (e.g., light edge regions) than in heat (e.g., dark edge regions). In addition, a bias may be implemented for sharpening towards pixel lightening to reduce energy consumption.

In examples described herein, module(s), as described herein, may be any combination of hardware and programming to implement the functionalities of the respective module(s). In some examples described herein, the combinations of hardware and programming may be implemented in a number of different ways. For example, the programming for the modules may be processor executable instructions stored on a non-transitory machine-readable storage medium and the hardware for the modules may include a processing resource to execute those instructions. In these examples, a computing device implementing such modules may include the machine-readable storage medium storing the instructions and the processing resource to execute the instructions, or the machine-readable storage medium may be separately stored and accessible by the computing device and the processing resource. In some examples, some modules may be implemented in circuitry.

FIG. 1 illustrates an example layout of a luminance-biased sharpening for thermal media printing apparatus (hereinafter also referred to as "apparatus 100").

Referring to FIG. 1, the apparatus 100 may include an input image conversion module 102 to convert an input image 104 to a grayscale luminance representation.

An image sharpening module 106 may determine, for each pixel of a plurality of specified pixels of the converted input image, a sharpening lightness value 108.

According to examples disclosed herein, the image sharpening module 106 may determine, for each pixel of the plurality of specified pixels of the converted input image and based on application of a monochrome un-sharp mask, the sharpening lightness value 108.

A sharpness ratio determination module 110 may determine, for each pixel of the plurality of specified pixels of the converted input image, a ratio 112 of the sharpening lightness value 108 to a corresponding original lightness value 114.

An output image generation module 116 may generate, based on the determined ratio 112, a sharpened output image 118 corresponding to the input image 104.

According to examples disclosed herein, the output image generation module 116 may generate, based on the determined ratio 112, the sharpened output image 118 corresponding to the input image 104 by multiplying, for each pixel of the plurality of specified pixels of the converted image, an output pixel value by a corresponding value of the determined ratio 112.

According to examples disclosed herein, the output image generation module 116 may generate, based on the determined ratio 112, the sharpened output image 118 corresponding to the input image 104 by multiplying, for each pixel of the plurality of specified pixels of the converted image, a corresponding value of the determined ratio 112 by red (R), green (G), and blue (B) components of a color. For example, if the ratio is determined to be 1.2, an input pixel of RGB values 80, 90, and 100 may scale to 96, 108, and 120.

According to examples disclosed herein, the output image generation module 116 may generate, based on the determined ratio 112, the sharpened output image 118 corresponding to the input image 104 by scaling, for each pixel of the plurality of specified pixels of the converted image, a luminance (Y) value of a Y, blue-difference chroma ($C_B$), and red-difference chroma ($C_R$) image representation by a corresponding value of the determined ratio. For example, with a pixel including Y, $C_B$, $C_R$ of 80, 40, 40, if the scale factor is 1.2, the result would be 96, 40, 40 for Y, $C_B$, and $C_R$ components.

According to examples disclosed herein, the output image generation module 116 may generate, based on the determined ratio 112, the sharpened output image 118 corresponding to the input image 104 by ascertaining a threshold value 120 for a dark ratio (e.g., a dark ratio threshold value as also disclosed herein) and another threshold value 122 for a light ratio (e.g., a light ratio threshold value as also disclosed herein). Further, the output image generation module 116 may determine, for each pixel of the plurality of specified pixels of the converted image, whether the determined ratio 112 is less than the threshold value 120 for the dark ratio, or whether the determined ratio is greater than the other threshold value 122 for the light ratio. For each pixel of the plurality of specified pixels of the converted image, based on a determination that the determined ratio 112 is less than the threshold value 120 for the dark ratio, the output image generation module 116 may change (e.g., by limiting) the determined ratio 112 to the threshold value 120 for the dark ratio. Further, for each pixel of the plurality of specified pixels of the converted image, based on a determination that the determined ratio 112 is greater than the threshold value 122 for the light ratio, the output image generation module 116 may change (e.g., by limiting) the determined ratio 112 to the threshold value 122 for the light ratio. The threshold value 120 for the dark ratio may be different from the other threshold value 122 for the light ratio. For example, the ratios may generally be different, such that if the dark threshold is 0.8 and the light threshold is 1.2, then a 20% increase or reduction in lightness (or luma) may be allowed. This threshold may represent an un-biased threshold. An example that adds bias may include setting the dark threshold to 0.8 and the light threshold to 1.50.

According to examples disclosed herein, the output image generation module 116 may generate, based on the determined ratio 112, the sharpened output image 118 corresponding to the input image 104 by ascertaining the threshold value 120 for a dark ratio. The output image generation module 116 may determine, for each pixel of the plurality of specified pixels of the converted image, whether the determined ratio 112 is less than the threshold value 120 for the dark ratio. Further, for each pixel of the plurality of specified pixels of the converted image, based on a determination that the determined ratio 112 is less than the threshold value 120 for the dark ratio, the output image generation module 116 may change (e.g., by limiting) the determined ratio 112 to the threshold value 120 for the dark ratio. In this regard, the threshold value 122 for the light ratio may effectively be set to infinity.

According to examples disclosed herein, the output image generation module 116 may generate, based on the determined ratio 112, the sharpened output image 118 corresponding to the input image 104 by ascertaining a first set of threshold values that include a first dark ratio threshold value and a first light ratio threshold value. The output image generation module 116 may ascertain a second set of threshold values that include a second dark ratio threshold value and a second light ratio threshold value. The output image generation module 116 may analyze, for each pixel of the plurality of specified pixels of the converted image and for an edge in the input image that transitions from dark to light in a print direction, the determined ratio relative to the first set of threshold values. The output image generation module 116 may analyze, for each pixel of the plurality of specified pixels of the converted image and for an edge in the input image that transitions from light to dark in the print direction, the determined ratio relative to the second set of threshold values. The first dark ratio threshold value may be different from the second dark ratio threshold value, and the first light ratio threshold value may be different from the second light ratio threshold value. With respect to the aforementioned sets of threshold values, there is effect on the heat transfer as the print media moves under the printhead. Thus, as edge pixels pass under the printhead, as the edge is more orientated in the direction of the printhead, the greater the effect on the heat transfer. In this instance, if the dark side is printed first, less energy may be utilized to not thermally blur into the light pixel that is next. If the pixels are printed from light to dark, relatively more energy may be utilized on the dark side. Yet further, the printhead may heat up relatively fast, and cool down relatively slowly. Since an image may be formed by moving the print media under an image wide thermal print bar, when a dark area is printed just before a light area, the print bar may carry heat from the dark into the light. However, if the image is rotated 180 degrees and again printed, the light area may instead be printed first, then the dark area may be printed just after the light area, and the printhead may be heated relatively fast. Thus, the sharpening on the dark side may be limited, and sharpening may be added to the light side. However, in the latter case, sharpening on the dark side may need to be limited, and thus sharpening may be performed differently based on the pixel transitions and the print direction.

Figure 2:
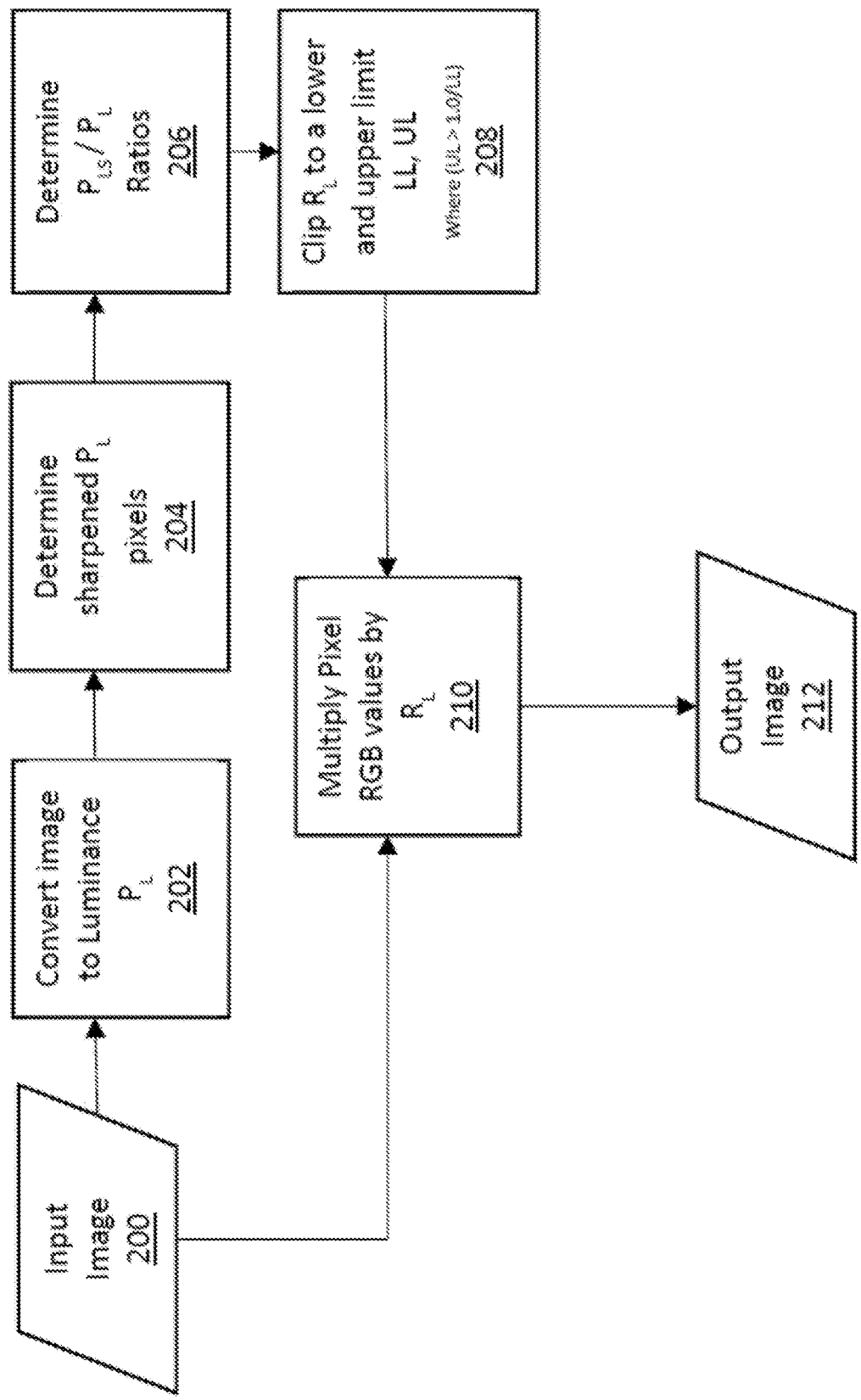
FIG. 2 illustrates a logical flow to illustrate operation of the luminance-biased sharpening for thermal media printing apparatus of FIG. 1.

FIG. 2 illustrates a logical flow to illustrate operation of the apparatus 100.

Referring to FIG. 2, at block 200, an input image 104 may be received, for example, by the input image conversion module 102.

At block 202, the input image conversion module 102 may convert the input image 104 to a grayscale luminance representation $P_L$. In this regard, the grayscale luminance representation $P_L$ may also be referred to as a "luma" or "lightness" representation.

At block 204, the image sharpening module 106 may determine, for each pixel of a plurality of specified pixels of the converted input image, a sharpening lightness value 108. That is, the image sharpening module 106 may determine a sharpening amount based on the grayscale image with a sharpening technique such as monochrome un-sharp mask. Thus, the image sharpening module 106 may determine sharpened $P_{LS}$ pixels.

At block 206, the sharpness ratio determination module 110 may determine, for each pixel of the plurality of specified pixels of the converted input image, the ratio 112 of the sharpening lightness value 108 to the corresponding original lightness value 114. In this regard, the sharpness ratio determination module 110 may determine a ratio of the sharpened grayscale pixels to the corresponding original grayscale pixels (e.g., $P_{LS}/P_L$ ratios, where $P_L$ represents a lightness value associated with the original grayscale pixel, $P_{LS}$ represents a lightness value associated with the sharpened grayscale pixel, and the ratio may be denoted $R_L$). For example, if the original pixel includes a lightness of 130, and after sharpening, 48 results, then the ratio 112 may be determined to be 0.369 (e.g., 48/130). The ratio 112 may be much larger than 1.0 if a pixel is brightened by sharpening.

As disclosed herein, the output image generation module 116 may generate, based on the determined ratio 112, the sharpened output image 118 corresponding to the input image 104 by multiplying, for each pixel of the plurality of specified pixels of the converted image, an output pixel value by a corresponding value of the determined ratio 112. Thus, the aforementioned ratio 112 may be used as a multiplier for an output pixel. For example, if an input pixel has values 80, 90, 100 for RGB, the resulting pixels for the 48/130 ratio would be 30, 33, 37.

With respect to the aforementioned ratio 112, smaller ratios (<1.0) may make a pixel darker (e.g., a dark ratio), and ratios>1.0 may make a pixel brighter (e.g., a light ratio).

As disclosed herein, the output image generation module 116 may generate, based on the determined ratio 112, the sharpened output image 118 corresponding to the input image 104 by ascertaining a threshold value 120 for a dark ratio and another threshold value 122 for a light ratio. At block 208, these threshold values 120 and 122 may be used to clip (e.g., limit) the ratios ($R_L$) determined at block 206 to lower and upper limits (where LL corresponds to the threshold value 120 for a dark ratio, and UL corresponds to the threshold value 122 for a light ratio). With respect to these threshold values 120 and 122, according to an example, the threshold value 120 for a dark ratio may be set at approximately 0.6, and the threshold value 122 for a light ratio may have no bounds (or a high value of 3.0). In this regard, sharpening may be achieved by lightning pixel areas more than darkening, and thermally, this may result in less over-development and color bleed. Yet further, instead of different bounds defined by these threshold values, different scale factors may be defined to reduce pixel darkening with a scale factor. With respect to the scale factors, instead of, or in addition to, setting limits for ratios>1.0 versus ratios<1.0 (lightening or darkening), scale factors may be defined to modify the ratios. There may be a scale factor that affects darkening (e.g., ratios <1.0), and a scale factor that affects lightening (e.g., ratios>1.0). For example, to lighten more than darken, the ratio 112 may be multiplied by a scale factor of 1.1 if the original ratio was greater than 1.0. Thus, this example may indicate that lighter pixels are all made 10% lighter than typical sharpening.

At block 210, the output image generation module 116 may generate, based on the determined ratio 112, the sharpened output image 118 corresponding to the input image 104 by multiplying, for each pixel of the plurality of specified pixels of the converted image, a corresponding value of the determined ratio by red (R), green (G), and blue (B) components of a color. Thus, the output image generation module 116 may multiply pixel RGB values by $R_L$, to generate the sharpened output image 118 at block 212.

As disclosed herein, the output image generation module 116 may generate, based on the determined ratio 112, the sharpened output image 118 corresponding to the input image 104 by ascertaining a first set of threshold values that include a first dark ratio threshold value and a first light ratio threshold value. The output image generation module 116 may ascertain a second set of threshold values that include a second dark ratio threshold value and a second light ratio threshold value. The output image generation module 116 may analyze, for each pixel of the plurality of specified pixels of the converted image and for an edge in the input image that transitions from dark to light in a print direction, the determined ratio relative to the first set of threshold values. The output image generation module 116 may analyze, for each pixel of the plurality of specified pixels of the converted image and for an edge in the input image that transitions from light to dark in the print direction, the determined ratio relative to the second set of threshold values. In this regard, for the dark to light edge, the darkening (or low scale factors) may be limited more to prevent thermal bleed compared to a light to dark print transition.

According to examples disclosed herein, when sharpening an edge with a sharpening technique, if the resulting pixel is determined to be lighter than the original pixel, the resulting pixel may be analyzed differently compared to whether the pixel is determined to be darker than the original pixel. As disclosed herein, a difference in threshold may be implemented based on how far a pixel may move. This difference may also be a difference in scale factor, so that the dark side may receive reduced effect, and the light side may receive enhanced effect. This may be implemented as, for example, where the dark side has a dark correction factor (e.g., 75%) and the light side has a light correction factor (e.g., 125%), then the delta on the dark side from the original (e.g., if it was −20 luma) may become −15 luma, and on the light side, (e.g., if it was +20 luma) may become +25 luma. Further, the correction factors may be implemented in a one-dimensional curve of correction scale factors with entries corresponding to the luma delta determined by a sharpening technique. Thus, a curve may vary from −255 to +255, indexed by the luma offset prescribed by a sharpening technique, and the entries of the curve may be a scale factor affecting that offset. Further, the offset by the original luma value of the pixel may also be varied, so that for each pixel luma value, there is a one-dimensional table that describes a scale factor for the offset amount. Thus, a two-dimensional table may be indexed in one dimension by luma (e.g., 0-255 in 8 bit), and the other dimension may include the offset (e.g., −255 to 255). The two-dimensional table may be extended to color so that it is indexed by the original pixel RGB value. In this case, the output factors may affect color channels instead (or in addition to) affecting the luma channel.

Figure 3:
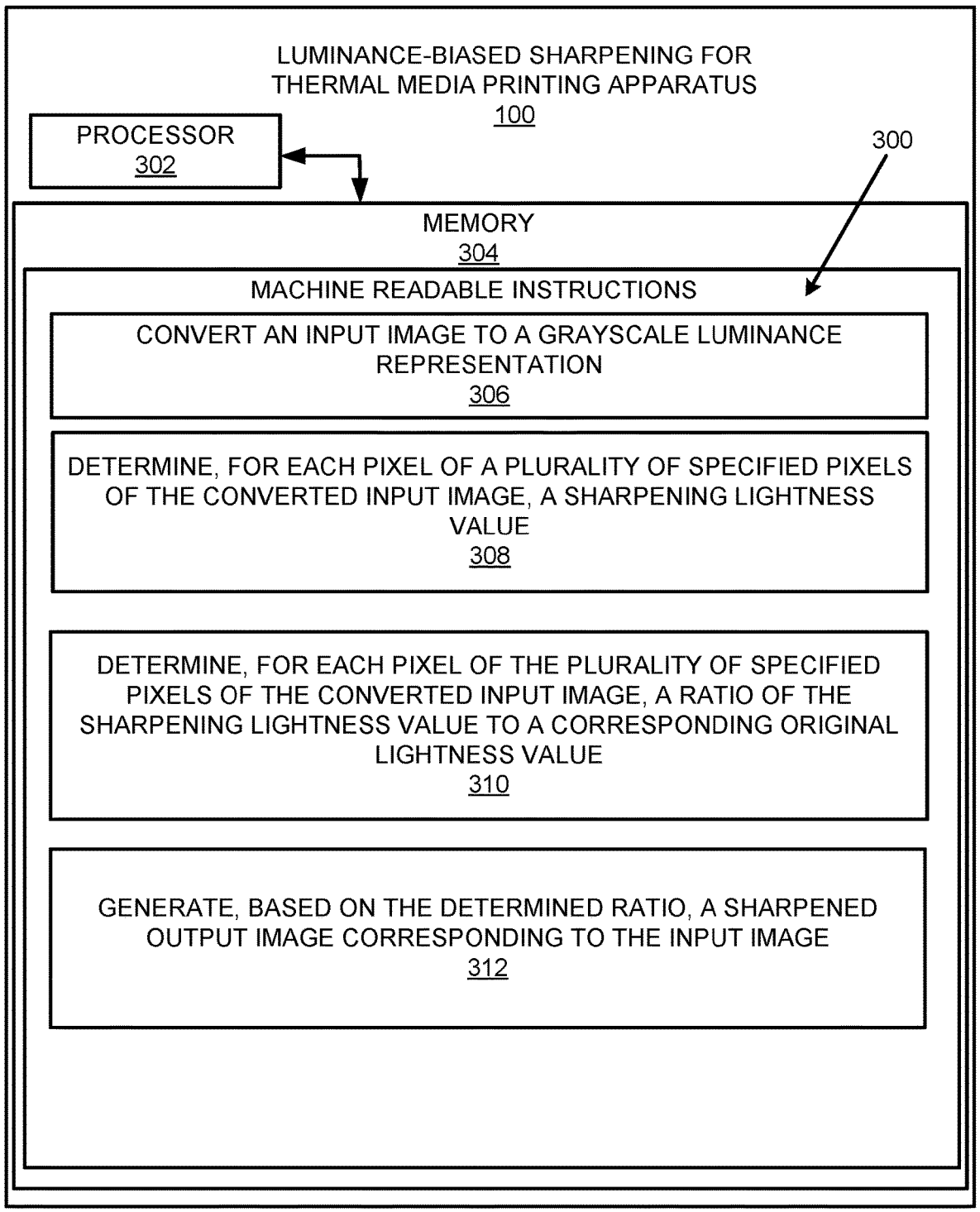
FIG. 3 illustrates an example block diagram for performing luminance-biased sharpening for thermal media printing.
Figure 5:
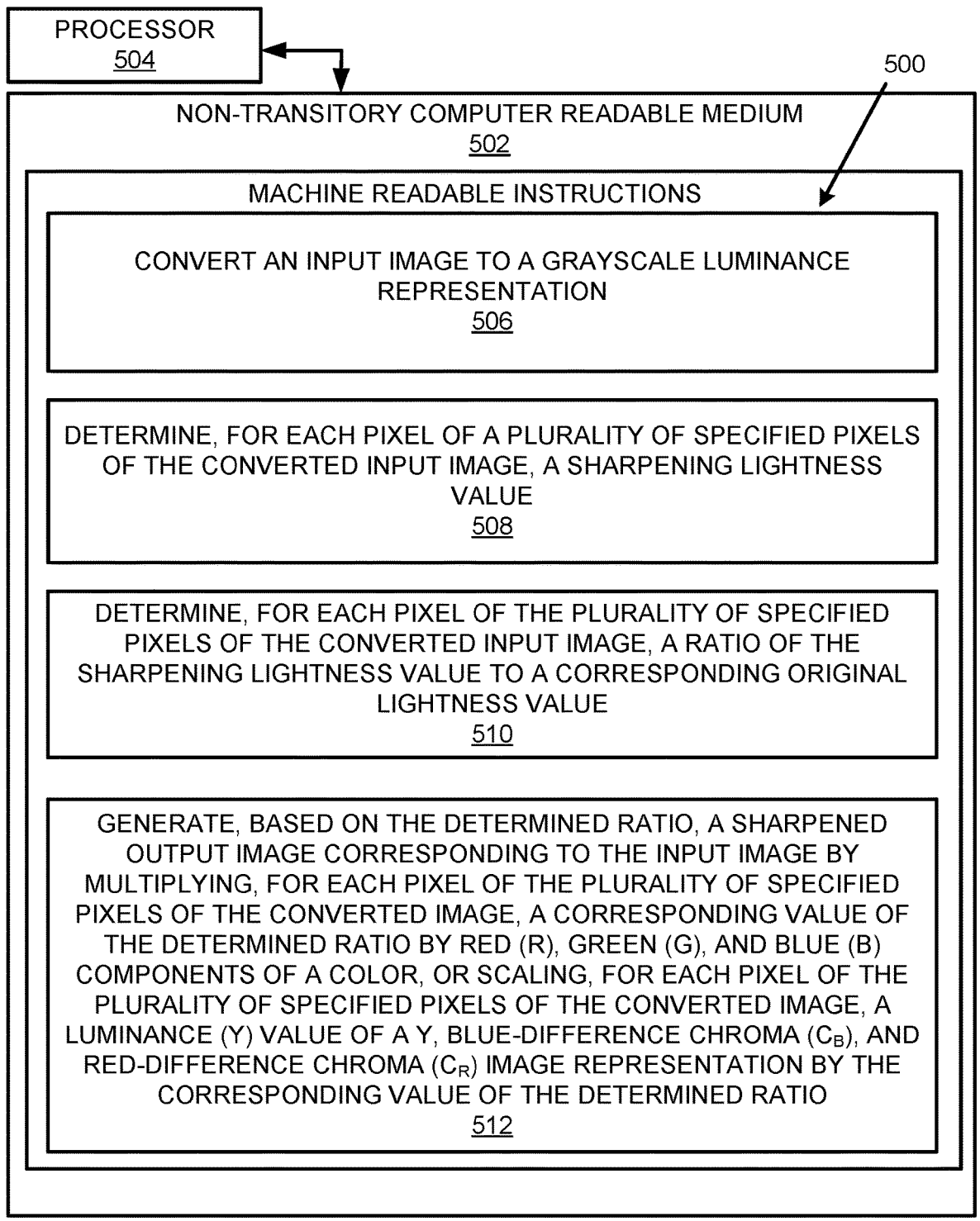
FIG. 5 illustrates a further example block diagram for performing luminance-biased sharpening for thermal media printing.

FIGS. 3-5 respectively illustrate an example block diagram 300, an example flowchart of a method 400, and a further example block diagram 500 for luminance-biased sharpening for thermal media printing. The block diagram 300, the method 400, and the block diagram 500 may be implemented on the apparatus 100 described above with reference to FIG. 1 by way of example and not limitation. The block diagram 300, the method 400, and the block diagram 500 may be practiced in other apparatus. In addition to showing the block diagram 300, FIG. 3 shows hardware of the apparatus 100 that may execute the instructions of the block diagram 300. The hardware may include a processor 302, and a memory 304 (i.e., a non-transitory computer readable medium) storing machine readable instructions that when executed by the processor 302 cause the processor to perform the instructions of the block diagram 300. The memory 304 may represent a non-transitory computer readable medium. FIG. 4 may represent a method for performing luminance-biased sharpening for thermal media printing. FIG. 5 may represent a non-transitory computer readable medium 502 having stored thereon machine readable instructions to perform luminance-biased sharpening for thermal media printing. The machine readable instructions, when executed, cause a processor 504 to perform the instructions of the block diagram 500 also shown in FIG. 5.

The processor 302 of FIG. 3 and/or the processor 504 of FIG. 5 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 502 of FIG. 5), such as hardware storage devices (e.g., RAM (random access memory), ROM (read only memory), EPROM (erasable, programmable ROM), EEPROM (electrically erasable, programmable ROM), hard drives, and flash memory). The memory 304 may include a RAM, where the machine readable instructions and data for a processor may reside during runtime.

Referring to FIGS. 1-3, and particularly to the block diagram 300 shown in FIG. 3, the memory 304 may include instructions 306 to convert an input image 104 to a grayscale luminance representation.

The processor 302 may fetch, decode, and execute the instructions 308 to determine, for each pixel of a plurality of specified pixels of the converted input image, a sharpening lightness value 108.

The processor 302 may fetch, decode, and execute the instructions 310 to determine, for each pixel of the plurality of specified pixels of the converted input image, a ratio 112 of the sharpening lightness value 108 to a corresponding original lightness value 114.

The processor 302 may fetch, decode, and execute the instructions 312 to generate, based on the determined ratio 112, a sharpened output image 118 corresponding to the input image 104.

Referring to FIGS. 1, 2, and 4, and particularly FIG. 4, for the method 400, at block 402, the method may include converting an input image 104 to a grayscale luminance representation.

At block 404, the method may include determining, for each pixel of a plurality of specified pixels of the converted input image, a sharpening lightness value 108.

At block 406, the method may include determining, for each pixel of the plurality of specified pixels of the converted input image, a ratio 112 of the sharpening lightness value 108 to a corresponding original lightness value 114.

At block 408, the method may include multiplying, for each pixel of the plurality of specified pixels of the converted image, an output pixel value by a corresponding value of the determined ratio.

At block 410, the method may include generating, based on the multiplying, for each pixel of the plurality of specified pixels of the converted image, of the output pixel value by the corresponding value of the determined ratio 112, a sharpened output image 118 corresponding to the input image 104.

Referring to FIGS. 1, 2, and 5, and particularly FIG. 5, for the block diagram 500, the non-transitory computer readable medium 502 may include instructions 506 to convert an input image 104 to a grayscale luminance representation.

The processor 504 may fetch, decode, and execute the instructions 508 to determine, for each pixel of a plurality of specified pixels of the converted input image, a sharpening lightness value 108.

The processor 504 may fetch, decode, and execute the instructions 510 to determine, for each pixel of the plurality of specified pixels of the converted input image, a ratio 112 of the sharpening lightness value 108 to a corresponding original lightness value 114.

The processor 504 may fetch, decode, and execute the instructions 512 to generate, based on the determined ratio 112, a sharpened output image 118 corresponding to the input image 104 by multiplying, for each pixel of the plurality of specified pixels of the converted image, a corresponding value of the determined ratio by red (R), green (G), and blue (B) components of a color, or scaling, for each pixel of the plurality of specified pixels of the converted image, a luminance (Y) value of a Y, blue-difference chroma ($C_B$), and red-difference chroma ($C_R$) image representation by the corresponding value of the determined ratio.

What has been described and illustrated herein is an example along with some of its variations. The terms, descriptions and figures used herein are set forth by way of illustration and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An apparatus comprising:
a processor; and
a non-transitory computer readable medium storing machine readable instructions that when executed by the processor cause the processor to:
convert an input image to a grayscale luminance representation;
determine, for each pixel of a plurality of specified pixels of the converted input image and based on application of a monochrome un-sharp mask, a sharpening lightness value;
determine, for each pixel of the plurality of specified pixels of the converted input image, a ratio of the sharpening lightness value to a corresponding original lightness value; and
generate, based on the determined ratio, a sharpened output image corresponding to the input image.

2. The apparatus according to claim 1, wherein the instructions to generate, based on the determined ratio, the sharpened output image corresponding to the input image, are further to cause the processor to:
multiply, for each pixel of the plurality of specified pixels of the converted image, an output pixel value by a corresponding value of the determined ratio.

3. The apparatus according to claim 1, wherein the instructions to generate, based on the determined ratio, the sharpened output image corresponding to the input image, are further to cause the processor to:
multiply, for each pixel of the plurality of specified pixels of the converted image, a corresponding value of the determined ratio by red (R), green (G), and blue (B) components of a color.

4. The apparatus according to claim 1, wherein the instructions to generate, based on the determined ratio, the sharpened output image corresponding to the input image, are further to cause the processor to:
scale, for each pixel of the plurality of specified pixels of the converted image, a luminance (Y) value of a Y, blue-difference chroma ($C_B$), and red-difference chroma ($C_R$) image representation by a corresponding value of the determined ratio.

5. The apparatus according to claim 1, wherein the instructions to generate, based on the determined ratio, the sharpened output image corresponding to the input image, are further to cause the processor to:
ascertain a dark ratio threshold value and a light ratio threshold value;
determine, for each pixel of the plurality of specified pixels of the converted image, whether the determined ratio is less than the dark ratio threshold value, or whether the determined ratio is greater than the light ratio threshold value;
for each pixel of the plurality of specified pixels of the converted image, based on a determination that the determined ratio is less than the dark ratio threshold value, change the determined ratio to the dark ratio threshold value; and
for each pixel of the plurality of specified pixels of the converted image, based on a determination that the determined ratio is greater than the light ratio threshold value, change the determined ratio to the light ratio threshold value.

6. The apparatus according to claim 5, wherein the dark ratio threshold value is different from the light ratio threshold value.

7. The apparatus according to claim 1, wherein the instructions to generate, based on the determined ratio, the sharpened output image corresponding to the input image, are further to cause the processor to:
ascertain a dark ratio threshold value;
determine, for each pixel of the plurality of specified pixels of the converted image, whether the determined ratio is less than the dark ratio threshold value; and
for each pixel of the plurality of specified pixels of the converted image, based on a determination that the determined ratio is less than the dark ratio threshold value, change the determined ratio to the dark ratio threshold value.

8. The apparatus according to claim 1, wherein the instructions to generate, based on the determined ratio, the sharpened output image corresponding to the input image, are further to cause the processor to:
ascertain a first set of threshold values that include a first dark ratio threshold value and a first light ratio threshold value;
ascertain a second set of threshold values that include a second dark ratio threshold value and a second light ratio threshold value;
analyze, for each pixel of the plurality of specified pixels of the converted image and for an edge in the input image that transitions from dark to light in a print direction, the determined ratio relative to the first set of threshold values; and
analyze, for each pixel of the plurality of specified pixels of the converted image and for an edge in the input image that transitions from light to dark in the print direction, the determined ratio relative to the second set of threshold values.

9. The apparatus according to claim 8, wherein the first dark ratio threshold value is different from the second dark ratio threshold value, and the first light ratio threshold value is different from the second light ratio threshold value.

10. A computer implemented method comprising:
converting an input image to a grayscale luminance representation;
determining, for each pixel of a plurality of specified pixels of the converted input image and based on application of a monochrome un-sharp mask, a sharpening lightness value;
determining, for each pixel of the plurality of specified pixels of the converted input image, a ratio of the sharpening lightness value to a corresponding original lightness value;
multiplying, for each pixel of the plurality of specified pixels of the converted image, an output pixel value by a corresponding value of the determined ratio; and
generating, based on the multiplying, for each pixel of the plurality of specified pixels of the converted image, of the output pixel value by the corresponding value of the determined ratio, a sharpened output image corresponding to the input image.

11. The computer implemented method according to claim 10, wherein generating, based on the multiplying, for each pixel of the plurality of specified pixels of the converted image, of the output pixel value by the corresponding value of the determined ratio, the sharpened output image corresponding to the input image further comprises:
ascertaining a dark ratio threshold value and a light ratio threshold value;
determining, for each pixel of the plurality of specified pixels of the converted image, whether the determined ratio is less than the dark ratio threshold value, or whether the determined ratio is greater than the light ratio threshold value;

for each pixel of the plurality of specified pixels of the converted image, based on a determination that the determined ratio is less than the dark ratio threshold value, changing the determined ratio to the dark ratio threshold value; and for each pixel of the plurality of specified pixels of the converted image, based on a determination that the determined ratio is greater than the light ratio threshold value, changing the determined ratio to the light ratio threshold value.

12. The computer implemented method according to claim 10, wherein generating, based on the multiplying, for each pixel of the plurality of specified pixels of the converted image, of the output pixel value by the corresponding value of the determined ratio, the sharpened output image corresponding to the input image further comprises:

ascertaining a first set of threshold values that include a first dark ratio threshold value and a first light ratio threshold value;

ascertaining a second set of threshold values that include a second dark ratio threshold value and a second light ratio threshold value;

analyzing, for each pixel of the plurality of specified pixels of the converted image and for an edge in the input image that transitions from dark to light in a print direction, the determined ratio relative to the first set of threshold values; and analyzing, for each pixel of the plurality of specified pixels of the converted image and for an edge in the input image that transitions from light to dark in the print direction, the determined ratio relative to the second set of threshold values.

13. A non-transitory computer readable medium having stored thereon machine readable instructions, the machine readable instructions, when executed, cause a processor to:

convert an input image to a grayscale luminance representation;

determine, for each pixel of a plurality of specified pixels of the converted input image and based on application of a monochrome un-sharp mask, a sharpening lightness value;

determine, for each pixel of the plurality of specified pixels of the converted input image, a ratio of the sharpening lightness value to a corresponding original lightness value; and generate, based on the determined ratio, a sharpened output image corresponding to the input image by multiplying, for each pixel of the plurality of specified pixels of the converted image, a corresponding value of the determined ratio by red (R), green (G), and blue (B) components of a color, or scaling, for each pixel of the plurality of specified pixels of the converted image, a luminance (Y) value of a Y, blue-difference chroma ($C_B$), and red-difference chroma ($C_R$) image representation by the corresponding value of the determined ratio.

14. The non-transitory computer readable medium according to claim 13, wherein the machine readable instructions to generate, based on the determined ratio, the sharpened output image corresponding to the input image, when executed, further cause the processor to:

ascertain a dark ratio threshold value and a light ratio threshold value;

determine, for each pixel of the plurality of specified pixels of the converted image, whether the determined ratio is less than the dark ratio threshold value, or whether the determined ratio is greater than the light ratio threshold value;

for each pixel of the plurality of specified pixels of the converted image, based on a determination that the determined ratio is less than the dark ratio threshold value, change the determined ratio to the dark ratio threshold value; and for each pixel of the plurality of specified pixels of the converted image, based on a determination that the determined ratio is greater than the light ratio threshold value, change the determined ratio to the light ratio threshold value.

\* \* \* \* \*